Patented Apr. 14, 1931

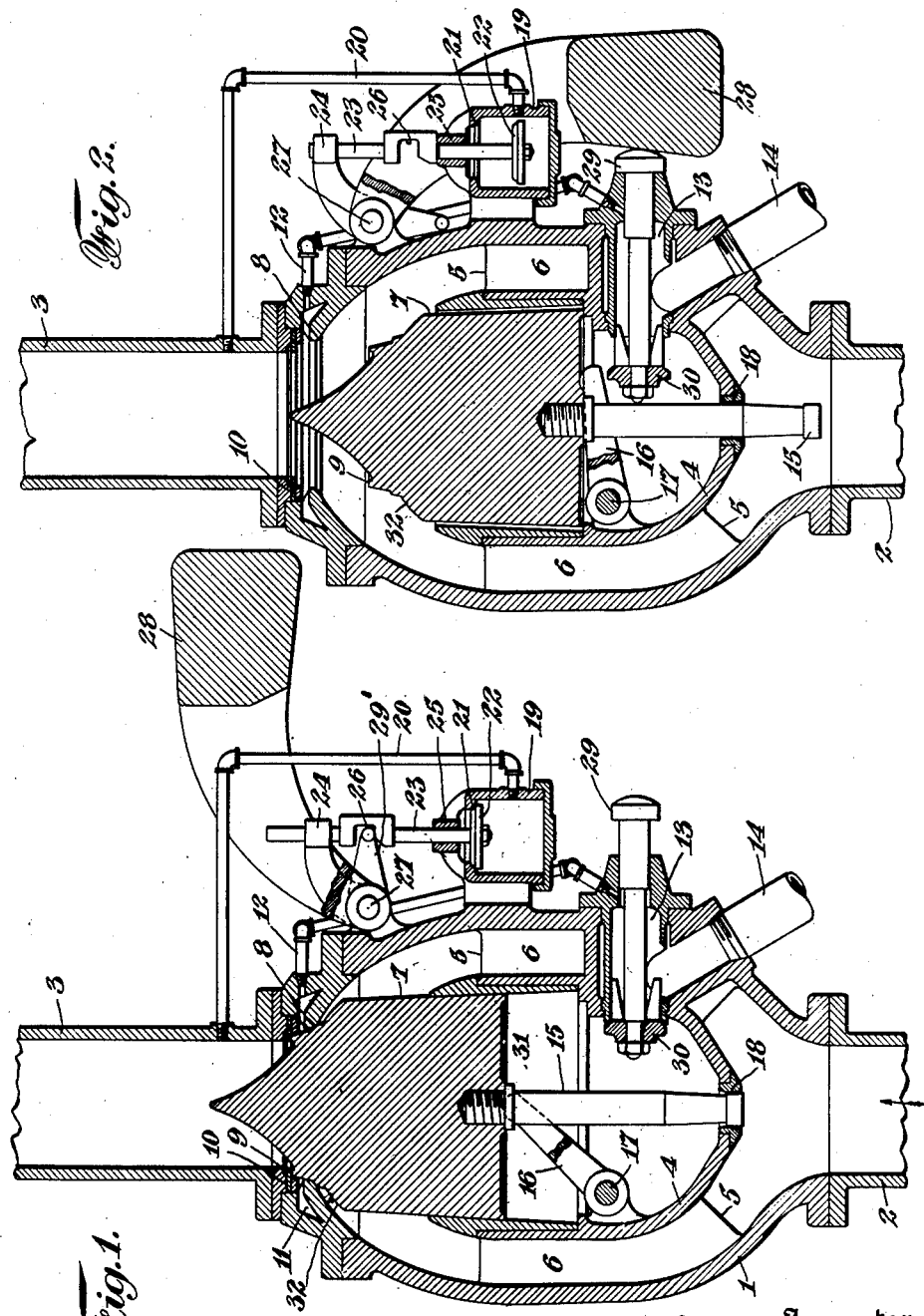

1,800,545

UNITED STATES PATENT OFFICE

CHESTER W. LARNER, OF PHILADELPHIA, PENNSYLVANIA, ASSIGNOR TO I. P. MORRIS & DE LA VERGNE, INCORPORATED, A CORPORATION OF DELAWARE

VALVE

Application filed May 15, 1926. Serial No. 109,234.

This invention relates generally to valves and more particularly to valve mechanisms adapted for use in automatic fire protection sprinkler systems, this invention finding particular use in the dry pipe type systems, but, of course, is applicable to other types and purposes.

Dry pipe sprinkler systems are used in buildings which are not heated in winter, and where, if water pressure were maintained at all times on the sprinkler heads, there would be danger of the water freezing in the pipes and thus putting the sprinklers out of commission as well as probably bursting the supply pipes.

In a dry pipe system the water supply is brought into a heated chamber either in the basement of the building to be protected or in some adjacent building, and there equipped with an automatic valve which is normally closed. The pipe leading from the valve to the sprinklers is filled with compressed air at a pressure usually lower than the pressure of the water supply. The valve is so designed that if there should be a fire melting out any of the sprinkler heads, the reduction of air pressure at the outlet of the valve, which would result from the escape of air through the melted sprinklers, would automatically open the valve and admit water to the sprinkler system.

Such valve necessarily stand for long periods unoperated, and must be designed with special attention to the prevention of sticking or clogging of any of the operating parts, which would naturally result from corrosion.

Also, special provision must be made to prevent accumulation of water in the air pipe due to leakage of the valve. Inasmuch as these valves may not be operated for long periods, it is obvious that a very slight leakage of water could easily accumulate sufficient volume of water in the air pipe to clog or burst the latter if the water should freeze.

One object of my invention is to provide an improved valve, the automatic operation of which is dependent primarily upon pressure drop at the discharge end and is unaffected by pressure increases at the inlet end or by any other pressure variations. A further object is to provide an improved arrangement of operating elements whereby the valve will be positive in operation so as to eliminate the possibility of sticking.

Further objects are to provide: a new arrangement for preventing leakage of water from entering the air end of the sprinkler system; an improved tapered relation of certain of the relatively movable parts, such as the plunger, and its guide; an improved means for guiding the movable element involved in this tapered relation; an improved arrangement for holding the plunger closed by fluid pressure and exhausting said pressure by an improved valve arrangement which is actuated by a heavy blow; and to control the impact or blow producing mechanism preferably by air pressure or pressure in the downstream pipe. A further object is to provide an improved means for resetting the valve mechanism after it is automatically opened.

Fig. 1 shows a cross-section of the valve closed and set for automatic opening;

Fig. 2 shows the valve after it has been automatically opened and before it has been closed and reset.

The valve has a circular body 1 connected at the inlet end to the water supply pipe 2 and at the other end to the pipe 3 leading to the sprinkler system. The body 1 contains an internal cylinder 4 connected to the body by radial ribs 5, thus providing an annular waterway 6 between the body and the internal cylinder. A plunger 7 slides within the internal cylinder and seats against the outlet end of the body at 8, thus shutting off the flow of water. There is a second seat 9 on the plunger, which in the closed position makes contact with a flexible ring 10. Between seats 8 and 9 a chamber 11 is provided in the outlet end of the valve body, and this chamber is connected by a pipe 12 to another chamber 13, which latter is drained by a pipe 14 leading to some region of atmospheric pressure. By means of this arrangement of drains, any water leaking past seat 8 is carried off and cannot enter pipe 3. Also, the escape of air from pipe 3 is prevented by packing 10. The latter is made flexible in order that it may adjust itself to the position of seat 9 on the plunger after the plunger has adjusted itself against the seat 8.

The plunger 7 may have a cylindrical fit in the cylinder 4, but preferably this fit is considerably tapered, since any corrosion of a cylindrical fit would interfere with the opening of the plunger, whereas a tapered fit will free itself immediately when the plunger moves.

Plunger 7 has a tail rod 15 acting as a guide and a lever 16 with a forked end which straddles rod 15 is mounted on a shaft 17 passing out through the valve body. By turning shaft 17, as by any suitable handle carried on the outer end of shaft 17, the plunger may be lifted by arm 16 to a closed position. The portion of rod 15 which works in the hole 18 is tapered also to prevent sticking. The plunger 7 may be hollow if desired, but is shown cast solid to increase its weight, which, of course, assists in the opening of the plunger.

Cylinder 19 is mounted on the outside of body 1 and is connected by pipe 20 to pipe 3, thus transmitting to cylinder 19 whatever air pressure exists in pipe 3. The upper end of cylinder 19 has a ground seat 21 against which a disc 22 seats to close the outlet and retain the air pressure in cylinder 19. Disc 22 is connected to rod 23, sliding vertically in guides 24 and 25. The middle portion of rod 23 is enlarged as shown and provided with a notch 26.

A rocker shaft 27 is rotatably mounted in bearings attached to body 1 and is keyed to a weight 28, the arms of which straddle pipe 20 and cylinder 19 together with the attached mechanism. There is also a lever 29' keyed to shaft 27. The outer end of lever 29 projects into and is supported in its upper position by the notch 26 in rod 23. It will thus be seen that weight 28 is supported by the air pressure on the bottom of disc 22, and that when the air pressure in cylinder 19 falls below the pressure necessary to support the weight which is provided, disc 22 will drop due to weight 28 which will thereafter be in the position as shown in Fig. 2.

Weight 28 as it approaches the end of its downward movement strikes a blow against valve stem 29, which opens valve 30 and exhausts chamber 31, thus opening plunger 7 as a result of the weight of the plunger and the hydraulic pressure on that portion 32 of plunger 7 which lies outside of seat 8, and which is thus exposed to the water pressure within the valve. The purpose of striking a blow against 29 is to provide a very positive and infallible means of opening valve 30 even to the extent of breaking the valve stem 29 loose from the parts surrounding them in case they should be stuck from corrosion.

It should be noted that the automatic operation of this valve is independent of pressures above normal in pipe 2 and independent of usual variations of normal pressure. The means for automatic operation are dependent primarily on the amount of air pressure in pipe 3. This is an important requirement for a dry pipe valve inasmuch as such a valve should not open unless the air pressure in the sprinkler system falls below a certain predetermined point. Until that point is reached the valve should stay closed regardless of fluctuations of water pressure. Such fluctuations are constantly occurring in all water supply lines, and they are a source of great trouble and inconvenience with many of the valves now commonly applied to this purpose which depend upon a balanced relation between the pressure of the air and the pressure of the water. With these prior arrangements a pressure rise or water hammer pushes the valve open and admits water to the sprinkler system. This may occur without the knowledge of the attendant, in which event serious damage may result before attention is called to the fact that there is water in the sprinkler system. The only case in which a valve of my invention could open accidentally is if the water pressure should fall below the air pressure. This, however, can be guarded against by using an air pressure so much below the water pressure that such a drop would never occur in actual practice.

The pressure at which the valve opens automatically is dependent upon the weight of element 28 and the area of disc 22. This may be varied to secure any desired result.

Fig. 2 shows the valve in open position as a result of the dropping of weight 28 following falling of the air pressure below the pressure necessary to support the weight. It will be observed that in this position valve stem 29 very nearly touches rod 15. If desired, stem 29 may be prolonged sufficiently to strike a blow against rod 15 and give plunger 7 a jar which would tend to free it if it should be stuck at any point from corrosion.

After the valve has opened and admitted water to the sprinkler system it is reset in following manner. First, plunger 7 is closed and reseated by means of lever 16, shaft 17 and an exterior handle attached thereto (not shown). This will permit full water pressure to build up in the body of the valve and in chamber 31 by leakage around plunger 7. The pressure in chamber 31 will close valve 30 as soon as weight 28 is lifted away from rod 29. After closing plunger 7, pipe 3 and the branches leading to the sprinklers are drained by a drain connected to pipe 3 and fairly close to the plunger seat. It is well, however, if there is no danger of freezing, to leave some water at the lower end of pipe 3, inasmuch as packing 10 is more easily made tight against water pressure than against air pressure. The water, however, should not be permitted to rise above the point where pipe 20 is connected to pipe 3. Otherwise, water will get into cylinder 19 and retard the drop of disc 22. The disc 22 should drop freely in air in order to permit weight 28 to fall as rapidly as possible and strike a heavy blow against pin 29. The next step is to lift weight 28 by hand or otherwise until lever 29 engaging the notch 26 lifts disc 22 and holds it against its seat. The required air pressure should then be applied to pipe 3, and being communicated to cylinder 19, this pressure will support weight 28, which may then be released.

In practice the air pressure to be maintained in pipe 3 would be considerably in excess of the pressure necessary to support weight 28. The reason for this is that sprinkler systems are often quite extensive, and it is difficult to prevent slight leaks at joints. These leaks, however, are comparatively small and would reduce the air pressure very slowly. Nevertheless, if the initial pressure were only a little above the critical pressure such sprinkler systems would require constant attention to prevent accidental opening of the dry pipe valves. By providing a liberal surplus of pressure, however, it is possible by only occasional inspection to check up and maintain the proper pressure without danger of opening the valves. On the other hand, as soon as one or more sprinkler heads melt out the escape of air is sufficiently rapid to reduce the pressure below the critical point in a comparatively short time, thus providing for the admission of water to the sprinkler system without undue delay.

It is obvious, of course, that the use of a valve of this design is not necessarily restricted to sprinkler service. It may be utilized in any system, where it is desired to separate the supply end from the distributing end, to maintain a higher pressure at the supply end than at the distributing end and to have the valve open automatically to admit water to the distributing end whenever the pressure in the latter falls below a predetermined point.

I claim:

1. In combination, a valve mechanism interposed between up and downstream pipes and comprising inner and outer casings spaced to form a relatively smooth annular fluid passageway having its axis substantially in alignment with the axes of said up and downstream pipes, a movable valve member cooperating with said inner casing to form a fluid chamber, means for holding said valve member closed irrespective of pressure increases in the upstream pipe, and means whereby opening of said valve is effected by fluid pressure in the upstream pipe automatically in accordance with a pressure drop in the downstream pipe, said opening means including a poppet valve for controlling exhaust of fluid pressure from said chamber, a weighted member adapted to strike said valve for effecting opening thereof, and means for holding said weighted member in an inoperative position spaced from said valve and adapted to release said weighted member upon drop of pressure in the downstream pipe, thereby to permit said weighted member to fall by gravity and strike said exhaust valve to insure opening thereof.

2. In combination, a valve mechanism interposed between up and downstream pipes and comprising inner and outer casings spaced to form a relatively smooth annular fluid passageway having its axis substantially in alignment with the axes of said up and downstream pipes, a movable valve member cooperating with said inner casing to form a fluid chamber and movable in the direction of normal flow to closing position, means for holding said valve member closed irrespective of pressure increases in the upstream pipe, and means whereby opening of said valve is effected by fluid pressure in the upstream pipe automatically in accordance with a pressure drop in the downstream pipe, said opening means including a valve for controlling exhaust of fluid pressure from said chamber, a weighted member adapted to strike said valve for effecting opening thereof, and means for holding said weighted member in an inoperative position spaced from said valve by an appreciable distance and adapted to release said weighted member upon drop of pressure in the downstream pipe, thereby to permit said weighted member to fall by gravity through said appreciable distance and strike said exhaust valve to insure opening thereof, said weighted member being held in its inoperative position directly by fluid pressure in the downstream pipe.

3. In combination, a valve mechanism interposed between up and downstream pipes of a sprinkler system, having a dry pipe with air pressure therein, said valve mechanism including a valve member movable during closing in the direction of normal flow through said pipes, and means for effecting opening movement thereof, including an impact member which is freely movable for an appreciable distance before effecting its impact action, and means whereby said impact member is held in its inoperative position directly by fluid pressure in the downstream dry pipe.

4. In combination, a valve mechanism interposed between up and downstream pipes of a sprinkler system, said mechanism having a movable valve member for directly controlling flow through said pipes, and means for effecting opening movement thereof from its seat, including means adapted to jar said valve member in a direction transversely of its seat which is thereafter opened independently of said jarring means.

5. In combination, a valve mechanism interposed between up and downstream pipes of a sprinkler system, said mechanism including a movable valve member for controlling fluid flow therethrough, and means for effecting opening movement thereof, including a control valve, and impact mechanism for striking said control valve and adapted also to jar said flow control valve.

6. In combination, a valve mechanism interposed between up and downstream pipes of a sprinkler system, said mechanism having a movable valve member, means forming a fluid pressure chamber for holding said member in closed position, and means for effecting opening movement of said valve member, including a fluid pressure held exhaust valve for said chamber, an impact member for opening said exhaust valve, and a valve adapted when closed to be held in position by pressure in said downstream pipe and which pressure directly holds said impact member in an inoperative position.

7. In combination, a valve mechanism adapted to be interposed between up and downstream pipes, said valve mechanism comprising a plunger, means forming a seat for said plunger whereby when said plunger is seated normal flow through said pipes is prevented, and means surrounding said plunger to form a chamber in which fluid pressure is adapted to hold said valve in one of its extreme positions, said latter means and plunger having cooperating tapered surfaces engaging each other when said plunger is in closed position, whereby said surfaces separate upon slight movement of said plunger.

8. In combination, a valve mechanism adapted to be interposed between up and downstream pipes, said valve comprising a plunger, means forming a seat for said plunger whereby when said plunger is seated normal flow through said pipes is prevented, a casing surrounding said plunger and cooperating therewith to provide a substantially closed fluid chamber therein, said plunger and casing having cooperating tapered surfaces engaging each other when said plunger is in said closed position, and a guiding rod for said plunger.

9. In combination, a valve mechanism adapted to be interposed between up and downstream pipes, said valve mechanism comprising a plunger, means forming a seat for said plunger whereby when said plunger is seated normal flow through said pipes is prevented, a casing surrounding said plunger and cooperating therewith to provide a substantially closed fluid chamber therein, said plunger and casing having cooperating tapered surfaces engaging each other when said plunger is in said closed position, and a guiding rod for said plunger, said rod having a substantial straight guiding portion.

10. In combination, a valve mechanism adapted to be interposed between up and downstream pipes, said valve mechanism comprising a plunger, means for surrounding the same, said plunger and latter means having cooperating tapered surfaces, a guiding rod for said plunger, and a guiding bushing cooperating with said rod, said rod and bushing having a tapered relation therebetween.

11. In combination, a valve mechanism adapted to be interposed between up and downstream pipes, said valve mechanism comprising a plunger, means cooperating therewith to form a fluid pressure chamber, a guiding rod carried by said plunger, and a cooperating guiding bushing carried by said chamber forming means, said bushing having a tapered opening through which fluid is adapted to be transmitted to said chamber from the upstream pipe.

12. A valve mechanism adapted for use in a dry pipe sprinkler system comprising inner and outer casings spaced to form a relatively smooth fluid passageway therebetween, a plunger cooperating with the inner casing to form a fluid pressure operating chamber, a plurality of seats formed in the downstream side of said valve mechanism to which a dry pipe will be connected, a plurality of seats formed on the downstream side of said plunger and adapted to simultaneously engage said seats, and a drainage passage intermediate said seats whereby leakage past the first seat will be prevented from flowing past the second seat and into the dry pipe.

13. A valve mechanism adapted for use in a dry pipe sprinkler system comprising inner and outer casings spaced to form a relatively smooth fluid passageway therebetween, a plunger cooperating with the inner casing to form a fluid pressure operating chamber, a plurality of seats formed in the downstream side of said valve mechanism to which a dry pipe is adapted to be connected, a plurality of seats formed on the downstream side of said plunger and adapted to simultaneously engage said seats, and a drainage passage intermediate said seats whereby leakage past the first seat will be prevented from flowing past the second seat and into the dry pipe, the most downstream one of said seats being flexible.

14. In combination, a valve mechanism interposed between up and downstream pipes of a sprinkler system in which liquid pressure is maintained in the upstream pipe and air pressure in the downstream pipe, a valve member movable during closing in the direction of normal flow through said pipes, actuating means for said valve disposed on the upstream side thereof, a valve seat between said up and downstream pipes adapted to be engaged by said valve member to close the normal path of fluid-flow therebetween, and means for preventing liquid flow into said downstream pipe even though leakage takes place past said valve seat.

15. A valve mechanism adapted for use in a sprinkler system having up and downstream pipes, comprising a plunger valve member, means for supporting plunger so that it is movable during closing in the direction of normal flow between said pipes, a plurality of valve seats for cooperation with said plunger disposed between said pipes, whereby a normal path of fluid-flow therebetween is controlled, and a drainage passage intermediate said seats.

16. A valve mechanism adapted for use in a sprinkler system having up and downstream pipes, comprising a plunger valve member, means for supporting plunger so that it is movable during closing in the direction of normal flow between said pipes, a plurality of valve seats for cooperation with said plunger disposed between said pipes, whereby a normal path of fluid-flow therebetween is controlled, and a drainage passage intermediate said seats, one of said seats and its cooperating portion carried by the valve member being relatively yieldable.

CHESTER W. LARNER.